Figure 4:
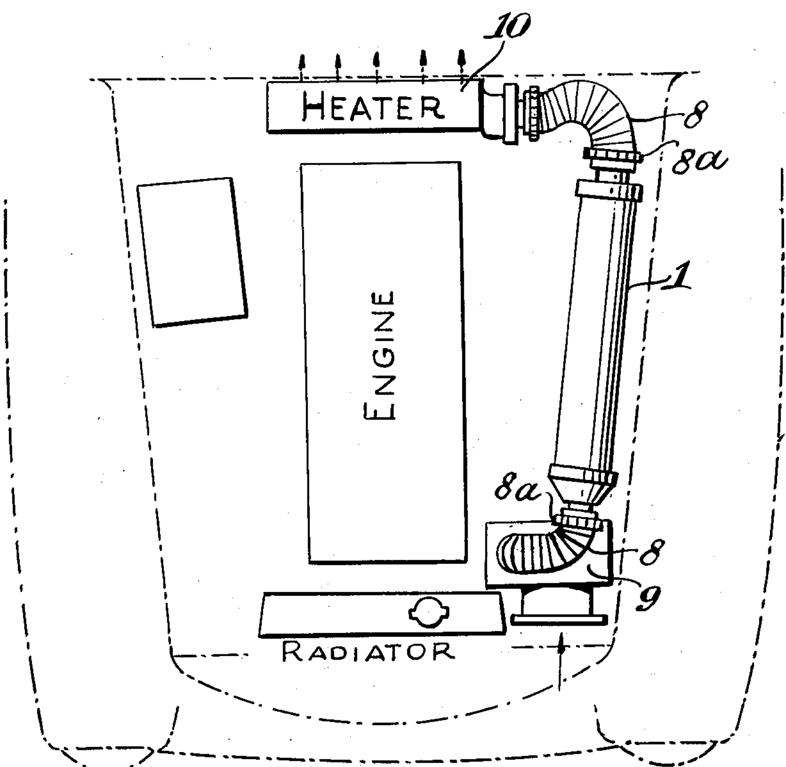

Jan. 9, 1962 G. C. MYDDELTON 3,016,108
FILTERS FOR USE IN MOTOR VEHICLES
Filed Nov. 9, 1959 2 Sheets-Sheet 1
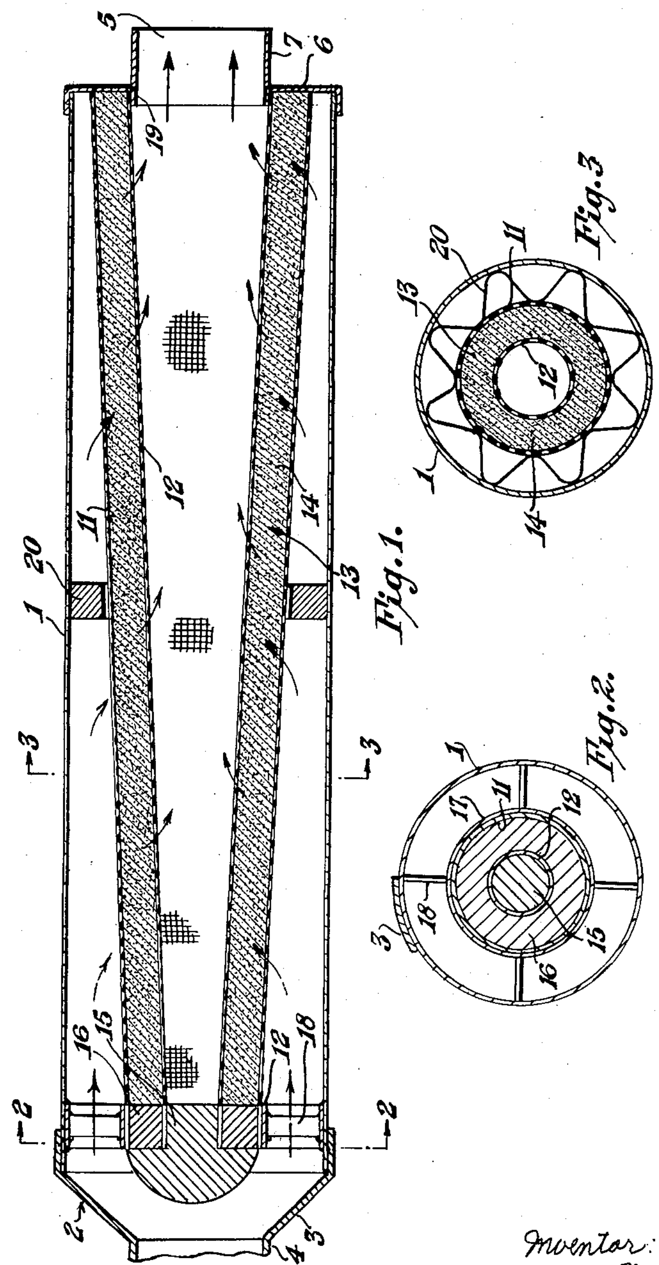
Inventor:
Geoffrey Cheadle Myddelton
BY:
Baldwin & Wight
Attorneys Inventor:
Geoffrey Cheadle Myddelton
By: Baldwin & Wight
Attorneys 3,016,108

FILTERS FOR USE IN MOTOR VEHICLES

Geoffrey Cheadle Myddelton, Parkside, Henley-on-Thames, England, assignor to Carbonaire S.A., Vaud, Switzerland, a company of Switzerland Filed Nov. 9, 1959, Ser. No. 851,591
Claims priority, application Great Britain Nov. 21, 1958
1 Claim. (Cl. 183—4.8)

The invention relates to filters and particularly to filters for use in purifying or deodorizing air entering a motor vehicle heating and/or ventilating system.

It is well known, particularly when travelling in dense traffic that the air drawn or pumped into a motor car heating system tends to carry with it petrol exhaust fumes, diesel fumes and other irritant and offensive gases emanating primarily from other vehicles.

It is among the objects of the invention to provide a filter which is of simple construction, is inexpensive to produce, and which is effective to eliminate or considerably reduce the unwanted fumes without unduly reducing the air flow.

According to the invention, an air filter for a motor vehicle heating and/or ventilating system comprises two elongated perforated cylindrical or substantially cylindrical members mounted concentrically with one another to leave an annular space therebetween, said space being packed with granulated charcoal or other filtering medium, an imperforate cylindrical outer housing concentrically mounted about said perforated members, means at the inlet end of the filter for plugging the bore formed by the inner perforated member and the annular space between the two perforated members, and closure means at the outlet end of the filter, for blocking off the annular space formed between the outer imperforate housing and the outer perforated member and the annular space between the two perforated members, whereby incoming air is forced to pass radially inwards through the filtering medium during its passage through the filter.

In a preferred construction, the cylindrical outer housing of the filter may form part of or be mounted in the connecting tube between the air intake fan and the heater of the car or it may completely replace the connecting tube. Alternatively the filter may be mounted on the air intake side of the fan.

Furthermore, the imperforate housing may be of metal or of reinforced rubber tubing. The perforated members are preferably of copper wire gauze.

The invention is diagrammatically illustrated by way of example in the accompanying drawings in which, FIGURE 1 is a longitudinal section through a filter according to the invention, FIGURE 2 is a cross-section on the line 2—2 of FIGURE 1, FIGURE 3 is a cross-section on the line 3—3 of FIGURE 1, and, FIGURE 4 is a schematic layout of one method of arranging the filter in a vehicle.

Referring to the drawings, the filter comprises an elongated imperforate cylindrical outer housing 1 of metal or reinforced rubber tubing.

The inlet end 2 of the filter is provided with a shroud or cup 3 which is secured to one end of the outer casing 1, the shroud or cap 3 having a connecting portion 4 of reduced cross-section. The outlet end 5 is similarly provided with a closure member 6 which is secured to the other end of the outer casing 1, the closure member 6 having a connecting portion 7 of reduced cross-section.

The inlet and outlet ends 2 and 5 of the housing 1 may be connected by their respective connecting portions 4 and 7 by means of flexible ducting 8 (FIG. 4) respectively to the air intake or heater fan 9 and the car heater 10 or alternatively the housing 1 may be extended to permit direct connection with the air intake or heater fan 9 and the car heater 10. Where the ducting 8 is used the respective connections may be effected by any suitable clips 8*a*.

Mounted within the housing 1 are two truncated cone-shaped members 11 and 12 of wire gauze or the like, hereinafter referred to as the outer core 11 and the inner core 12, which are concentrically mounted so as to form an annular space 13 between them. The annular space 13 is packed with activated charcoal 14 in granular form.

At the inlet end 2 of the filter, the bore formed by the inner perforated core 12 is blocked by means of a plug 15 and the annular space 13 formed between the two cones 11 and 12 is blocked by an annular plug member 16. For aerodynamic purposes the plug 15 is preferably bullet-shaped as shown in FIGURE 1 or otherwise formed to deflect incoming air and thereby assist the flow of air through the filter.

The arrangement, consisting of the ends of the cones 11 and 12 and of the plugs 15 and 16 at the inlet end 2 is held in position by means of a ring or band element 17 which is supported by a number of radially disposed spacer members 18 secured between the element 17 and the outer housing 1.

The closure member 6 mounted on the outlet end 5 of the filter also serves to block off the annular space formed between the outer housing 1 and the outer cone 11 and the space between the cones 11 and 12.

The member 6 also serves to support the members 11 and 12 and for this purpose may be provided with an annular projection 19.

The plug members 15 and 16 or the closure member 6 may be adapted to be readily removable so as to permit replacement of the activated charcoal.

Mounted at a position intermediate of the inlet and outlet, as shown, in the region of the longitudinal centers of the housing 1 and the wire gauze cone members 11 and 12, and in the annular space between the housing 1 and the outer cone 11, is a metal spacer strip 20 of sinuous section. The spacer strip 20 serves primarily to give support to the central portion of the filter element. However, due to its shape it forms a resilient support so that vibration of the motor of the vehicle causes the strip 20 to vibrate the filter element and thereby to dislodge any particles of dust which are liable to clog the filter and impair its efficiency.

Thus, the incoming air passes through the annular space formed between the outer housing 1 and the perforated outer-cone 11 where it filters through the layer 14 of activated charcoal into the bore formed by the perforated inner cone 12, and the purified air thus produced passes into the car heater for circulation within the car.

It will be appreciated that the invention provides a filter which is particularly suitable for the purpose defined and which incorporates the following advantageous features for achieving this end:

(*a*) The outer and inner perforated cones and thus also the layer of granulated activated charcoal are arranged longitudinally of the filter housing thus providing a large filter area and a minimum resistance to the air flowing through the filter.

(*b*) By causing the air to be treated to pass inwardly through the charcoal layer, that is to say first through the outer cone and then through the inner cone, there is less likelihood of the filter becoming completely clogged by dust during its time of service since the build-up of dust on the outer cone, which has a larger surface area than that of the inner cone, would be much slower than would be the case were the air to pass first through the inner cone.

(*c*) Any loose particles of dust which do collect on the outer cone are dislodged by vibration of the motor through the supporting strip 20 and will fall harmlessly into the bottom of the outer housing. However, if the air were passed outwardly from the inside of the filter, such dust particules would drop on to the filtering layer itself and thus impair its efficiency.

(*d*) A still further advantage of passing the air inwardly through the charcoal layer is that it tends to prolong the life of the filter since the maximum use is made of the amount of charcoal used. The reason for this is that, since the filter element is symmetrical, it can be assumed that incoming air passes equally through all parts of the layer of activated charcoal and also that the layer consists of a series of concentric layers of charcoal through which the air to be purified passes in succession. Thus, in use, the outermost imaginary layer will be the first layer to absorb the impurities in the air and when this layer becomes saturated the remaining layers will come into "operation" in succession until the remaining layer is too thin to be completely effective. The same sequence of "operation" will take place when the air is passed outwardly from the inside and similarly a layer which is too thin to be completely effective will ultimately remain.

Since the thickness of the ineffective layer is the same in both cases it will be appreciated that the effective volume of charcoal when passing the air inwards is greater than when passing the air outwards. Thus when passing the air inwardly the filter has a longer life than when the air passes outwardly since the effective amount of charcoal is greater.

Although the invention has been described with reference to granulated active charcoal alone as the filtering medium, it will be understood that any other suitable granulated or fibrous material may be used either alone or in combination with the charcoal.

What we claim is:

A filter unit for use in deodourizing atmospheric air passed into the heating and ventilating system of a motor vehicle, comprising an elongated imperforate cylindrical housing, a first elongated truncated cone-shaped wire gauze member mounted concentrically with said housing and within said housing to extend substantially the whole length thereof and to leave an annular space between said housing and said first member, a second elongated truncated cone-shaped wire gauze member mounted concentrically with said first member and within said first member to extend substantially the whole length of said housing and to leave an annular space between said first and second members, a layer of granulated activated charcoal packed in the annular space between said first and second members, a cap portion mounted on one end of said housing adjacent the ends of smaller diameter of said first and second members and forming the inlet end of said filter, a closure member mounted on the other end of said housing adjacent the ends of larger diameter of said first and second members and forming the outlet end of said filter, said closure member also serving to block off the annular space between said housing and said first member and between said first and second members, an annular plug member for blocking the annular space between said first and second members at said inlet end, a bullet-shaped plug member for blocking the bore of said second member at said inlet end and for guiding air through said filter with minimum resistance, a resilient metal spacing strip of sinuous cross-section mounted intermediate of said inlet and outlet ends and in said annular space between said housing and said first member to extend around and engage said first member at circumferentially spaced zones and to extend within and engage said housing for resiliently supporting said first and second members and said layer of charcoal in the region of the longitudinal centers of said housing and said first and second members, and means formed at said inlet and said outlet ends for connecting said filter to the air conduit of the motor vehicle, whereby contaminated air is caused to pass through said filter from said inlet to said outlet in such manner that it traverses said first member, said layer of charcoal and said second member in a direction which is radially inwards towards the lobngitudinal axis of said filter.

References Cited in the file of this patent

UNITED STATES PATENTS

| | | |
|---|---|---|
| 1,702,804 | Winslow | Feb. 19, 1929 |
| 2,214,737 | Dauphinee | Sept. 14, 1940 |
| 2,404,468 | Vokes et al. | July 23, 1946 |
| 2,556,292 | Newcum | June 12, 1951 |